US010774927B2

(12) United States Patent
Mourousoglou

(10) Patent No.: US 10,774,927 B2
(45) Date of Patent: Sep. 15, 2020

(54) METHOD TO DETERMINE LEAKAGE OF A HYDRAULIC PUMP

(71) Applicant: ZF Friedrichshafen AG, Friedrichshafen (DE)

(72) Inventor: Dimitrios Mourousoglou, Ertingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 253 days.

(21) Appl. No.: 16/027,796

(22) Filed: Jul. 5, 2018

(65) Prior Publication Data
US 2019/0011045 A1 Jan. 10, 2019

(30) Foreign Application Priority Data
Jul. 6, 2017 (DE) .................. 10 2017 211 538

(51) Int. Cl.
| *G06F 11/00* | (2006.01) |
| *F16H 61/12* | (2010.01) |
| *F04C 14/28* | (2006.01) |
| *F16H 61/00* | (2006.01) |
| *F16H 57/04* | (2010.01) |
| *G07C 5/08* | (2006.01) |

(52) U.S. Cl.
CPC ............ *F16H 61/12* (2013.01); *F04C 14/28* (2013.01); *F16H 57/0441* (2013.01); *F16H 57/0442* (2013.01); *F16H 57/0446* (2013.01); *F16H 61/0031* (2013.01); *G07C 5/085* (2013.01); *F04C 2270/86* (2013.01); *F16H 2061/1264* (2013.01)

(58) Field of Classification Search
CPC .. F16H 61/12; F16H 61/0031; F16H 57/0442; F16H 57/0441; F16H 57/0446; F16H 2061/1264; F16H 2312/14; F04C 14/28; F04C 2270/86; G07C 5/085; G01M 17/007; G01M 17/00; G06F 11/00
USPC ......... 701/29.2, 102; 60/277, 289, 290, 293; 73/114.69, 118.1; 96/421; 180/190; 417/403, 416, 417, 345
See application file for complete search history.

(56) References Cited

U.S. PATENT DOCUMENTS

| 7,881,852 | B2 * | 2/2011 | Heinrich | G01M 3/025 701/102 |
| 8,428,846 | B2 * | 4/2013 | Bedard | F04B 49/065 701/102 |
| 8,996,233 | B2 * | 3/2015 | Waku | G06F 17/00 701/29.2 |
| 2012/0245820 | A1 * | 9/2012 | Miyamoto | F04B 49/20 701/102 |
| 2012/0296509 | A1 * | 11/2012 | Wakita | B60W 10/06 701/22 |
| 2013/0268182 | A1 * | 10/2013 | Treharne | F02N 11/0829 701/113 |
| 2013/0341934 | A1 * | 12/2013 | Kawanishi | F03D 80/70 290/1 A |
| 2015/0019106 | A1 * | 1/2015 | Cunningham | F02D 13/0265 701/102 |

FOREIGN PATENT DOCUMENTS

| JP | 2013024033 A | 2/2013 |
| JP | 2013155782 A | 8/2013 |

OTHER PUBLICATIONS

German Search Report DE102017211538.6 dated Mar. 2, 2018. (10 pages).

* cited by examiner

*Primary Examiner* — Shardul D Patel
(74) *Attorney, Agent, or Firm* — Dority & Manning, P.A.

(57) ABSTRACT

A method for detecting an oil leakage of a main pump during a stopping process of an internal combustion engine, where the oil leakage is caused by a reversal of a direction of rotation of a crankshaft of a vehicle including an electric auxiliary pump and the main pump, where the main pump is driven by the internal combustion engine of the vehicle. The method includes determining whether a rotational speed of the electric auxiliary pump exceeds a predefined threshold value, and when the rotational speed of the electric auxiliary pump exceeds the predefined threshold value for the rotational speed, detecting that the main pump is leaking, recording an error in an error memory of the vehicle, and demanding an engine start.

2 Claims, No Drawings

METHOD TO DETERMINE LEAKAGE OF A HYDRAULIC PUMP

FIELD OF THE INVENTION

The present invention relates generally to a method for detecting an oil leakage of a main pump during a stopping process of an internal combustion engine, the oil leakage being caused by a reversal of a direction of rotation of a crankshaft in a vehicle comprising an electric auxiliary pump and the main pump, where the main pump is driven by the internal combustion engine of the vehicle.

BACKGROUND

From the prior art, it is known to implement the oil supply of transmissions in the passenger car and commercial vehicle sectors via positive displacement pumps which are fixed displacement pumps acting as main pumps and which are driven by the internal combustion engine of the motor vehicle. It is further known from the prior art to provide an electric auxiliary pump in the case of a transmission of a hybrid drive train of a motor vehicle in order to ensure the oil supply when the internal combustion engine is stopped, for example, when the vehicle is at a standstill or during purely electric driving. The gear select interlock during electric driving as well as the cooling of the transmission are to be ensured by the auxiliary pump. This auxiliary pump is generally operated only when the main oil pump, which is driven by the internal combustion engine or by yet another prime mover, can no longer ensure the required flow rate or oil pressure.

On the basis of measurements, it was determined that, in vehicles comprising a main pump, which is driven by the internal combustion engine of the vehicle, and comprising an electric auxiliary pump, the direction of rotation of the internal combustion engine, and therefore the rotation of the crankshaft, can reverse during an internal combustion engine stopping process, whereby the internal combustion engine can counter-oscillate/kick back in the opposite direction of rotation for a short time. This disadvantageously results in an oil leakage in the main pump which is driven by the internal combustion engine and which is generally a sliding vane pump. The oil leakage is caused by the fact that a sliding vane pump functions correctly in only one direction of rotation and, upon rotation in the opposite direction, a gap forms between the vane and the wall, which causes a leakage.

This oil leakage of the main pump results in non-defined rotational speeds of the electric auxiliary pump and, therefore, undefined pressure and lubricating oil conditions, which negatively influence the durability of the transmission.

SUMMARY OF THE INVENTION

The problem addressed by the present invention is that of providing a method for detecting an oil leakage of a main pump during a stopping process of an internal combustion engine, the oil leakage being caused by a reversal of a direction of rotation of a crankshaft in a vehicle comprising an electric auxiliary pump and the main pump, the main pump being driven by the internal combustion engine of the vehicle.

DETAILED DESCRIPTION

Reference will now be made to embodiments of the invention. Each embodiment is provided by way of explanation of the invention, and not as a limitation of the invention. For example, features described as part of one embodiment can be combined with another embodiment to yield still another embodiment. It is intended that the present invention include these and other modifications and variations to the embodiments described herein.

Accordingly, a method is provided for detecting an oil leakage of a main pump during a stopping process of an internal combustion engine, the oil leakage being caused by a reversal of the direction of rotation of the crankshaft in a vehicle comprising an electric auxiliary pump and the main pump, where the main pump is driven by the internal combustion engine of the vehicle. The method includes using the rotational speed of the electric auxiliary pump as the reference for the leak tightness of the main pump. When it is detected that the rotational speed of the electric auxiliary pump takes on values which exceed a predefined threshold value for the rotational speed, the main pump is detected as leaking, an error is recorded in an error memory of the vehicle, and an engine start is demanded, as the rotational speed of the electric auxiliary pump can only exceed the predefined threshold value when the main pump is leaking due to a reversal of the direction of rotation of the crankshaft.

According to one refinement of the invention, it is alternatively or additionally checked whether the rotational speed of the electric auxiliary pump has reached a predefined value after an applicable time since the internal combustion engine was stopped. If the predefined value has not been reached, a leak caused by a reversal of the direction of rotation of the crankshaft is detected, an error is recorded in an error memory of the vehicle, and an engine start is demanded, since a sufficiently high pump capacity of the electric auxiliary pump is not present.

Due to the design according to the invention, it is ensured that, if a leakage of the main pump occurs during an internal combustion engine stopping process due to a reversal of the direction of rotation of the crankshaft and an insufficiently high pump capacity of the electric auxiliary pump, the internal combustion engine is started, whereby the durability of the lubricating and cooling system is not imperiled or compromised.

Modifications and variations can be made to the embodiments described herein without departing from the scope and spirit of the invention as set forth in the appended claims.

The invention claimed is:

1. A method for detecting an oil leakage of a main pump during a stopping process of an internal combustion engine, the oil leakage being caused by a reversal of a direction of rotation of a crankshaft of a vehicle comprising an electric auxiliary pump and the main pump, the main pump being driven by the internal combustion engine of the vehicle, the method comprising:
   determining whether a rotational speed of the electric auxiliary pump exceeds a predefined threshold value, and
   when the rotational speed of the electric auxiliary pump exceeds the predefined threshold value for the rotational speed, then
      detecting that the main pump is leaking,
      recording an error in an error memory of the vehicle, and
      demanding an engine start.

2. A method for detecting an oil leakage of a main pump during a stopping process of an internal combustion engine, the oil leakage being caused by a reversal of a direction of rotation of a crankshaft in a vehicle comprising an electric auxiliary pump and the main pump, the main pump being driven by the internal combustion engine of the vehicle, the method comprising:
- determining whether a rotational speed of the electric auxiliary pump has reached a predefined value after an applicable time since the stopping process of the internal combustion engine, and
- when the predefined value has not been reached, then detecting that the main pump is leaking,
  - recording an error in an error memory of the vehicle, and
  - demanding an engine start.

\* \* \* \* \*